United States Patent

[11] 3,590,357

[72] Inventor Donald Reid
 4909, Clanranald Avenue, Notre-Dame-de-Graces, Montreal 248, Quebec, Canada
[21] Appl. No. 874,312
[22] Filed Nov. 5, 1969
[45] Patented June 29, 1971

[54] BATTERY BOOSTER
 9 Claims, 2 Drawing Figs.
[52] U.S. Cl................................................. 320/7,
 307/115, 307/136, 317/11, 320/25, 335/107
[51] Int. Cl......................................................... H02j 7/00
[50] Field of Search............................................ 320/6, 7,
 15, 16, 25, 26; 317/11; 307/113, 115, 127, 136,
 137, 138; 335/107

[56] References Cited
 UNITED STATES PATENTS

| | | | |
|---|---|---|---|
| 2,725,488 | 11/1955 | Hueffed et al. ............. | 320/16 |
| 3,051,887 | 8/1962 | Lind............................ | 307/127 X |
| 3,105,910 | 10/1963 | Chambers .................. | 320/48 X |
| 3,281,816 | 10/1966 | Raymond .................... | 320/25 X |
| 3,296,515 | 1/1967 | Knauth......................... | 320/25 X |
| 3,341,762 | 9/1967 | Rockoff........................ | 320/25 X |
| 3,343,057 | 9/1967 | Smith ........................... | 320/25 X |
| 3,366,837 | 1/1968 | Mester ......................... | 307/11 |

Primary Examiner—J. D. Miller
Assistant Examiner—John M. Gunther
Attorney—Raymond A. Robic ABSTRACT: A system for use in boosting the weak battery of a vehicle to permit operation of the starter of such a vehicle including at least one booster battery for providing the required energy for boosting the weak battery. The circuit for connecting the booster battery to the weak battery of the vehicle includes a relay having an electromagnetic winding connected to an energizing circuit and an armature responsive to the electromagnetic winding for operating a main set of contacts and an auxiliary set of contacts. A resistor is connected in series with the auxiliary set of contacts and the series combination of said auxiliary set of contacts and said resistor is connected in parallel with said main set of contacts. The booster battery is connected to the weak battery through said sets of main and auxiliary contacts and the armature of the relay is designed in such a way as to close said auxiliary set of contacts ahead of said main set of contacts and to open said auxiliary set of contacts after said main set of contacts so as to prevent arcing at the terminals of said main set of contacts due to the energy stored in the starter of the vehicle.

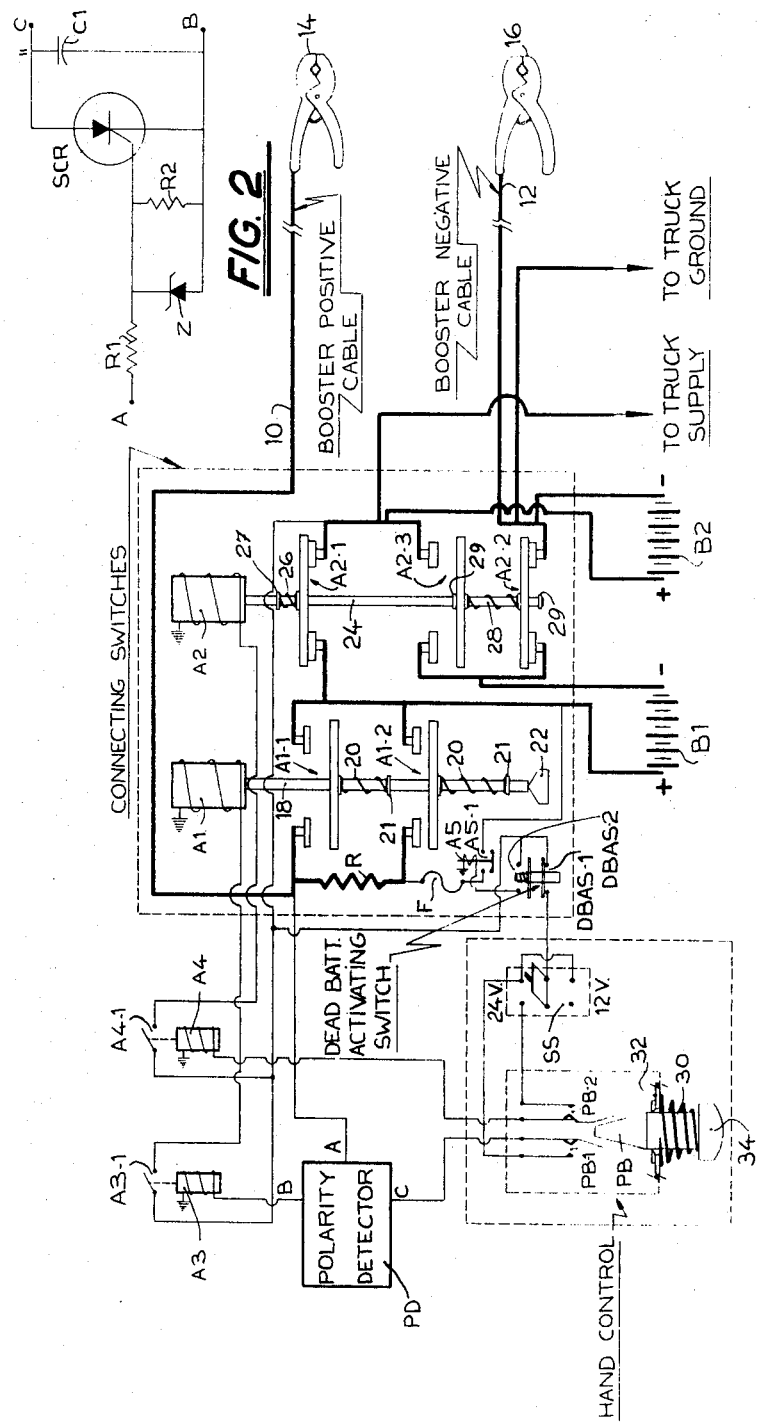
PATENTED JUN29 1971 3,590,357
INVENTOR
Donald REID
ATTORNEY

BATTERY BOOSTER

This invention relates to a battery booster for use in assisting the starting of a vehicle having a weak or dead battery.

Systems of the above type comprising generally at least one booster battery which is kept continuously charged and relay means for connecting such booster battery through a pair of cables to the weak or dead battery of a vehicle, in order to operate the starter of such vehicle, have been known for years. The boosters are often equipped with polarity detectors which detect the polarity of the weak battery to which the cables are connected in order to prevent operation of the relay means when the polarity of the weak battery does not correspond to the polarity of the boosting battery so as to prevent damage to the alternator of the vehicle when an alternator is used, as commonly known.

It has been found, however, that the contacts of the relay means have a tendency to burn out very quickly due to arcing caused by the discharge through the contacts of the energy accumulated in the winding of the starter of the vehicle. Also, when using a polarity detector, it has been found that such a detector will not operate if the battery of the vehicle is completely dead.

It is therefore the main feature of the invention to provide a booster including a relay equipped with means for absorbing such energy so as to prevent damage to the contacts of the relay.

It is also a feature of the invention to provide a booster including means for temporarily connecting the booster battery to the battery of the vehicle to be started when such battery is dead. Such connection will provide to the dead battery a charge sufficient for subsequently operating the polarity detector.

The system, in accordance with the invention, includes at least one booster battery for providing the required energy for boosting the weak battery. The circuit for connecting the booster battery to the weak battery of the vehicle includes a relay having an electromagnetic winding connected to an energizing circuit, and an armature responsive to said electromagnetic winding for operating a main set of contacts and an auxiliary set of contacts. A resistor is connected in series with the auxiliary set of contacts and the series combination of said auxiliary set of contacts and said resistor is connected in parallel with said main set of contacts. The booster battery is connected to the weak battery through said main and auxiliary set of contacts and the armature of said relay is designed in such a way as to close said auxiliary set of contacts ahead of said main set of contacts and to open said auxiliary set of contacts after said main set of contacts so as to prevent arcing at the terminals of said main set of contacts due to the energy stored in the starter of the vehicle.

A system, in accordance with the invention, is further provided with a polarity detector positioned in the energizing circuit of said relay so as to prevent energization of said relay when the poles of the boosting battery are connected to the opposite poles of the weak battery of the vehicle. In addition, the system in accordance with the invention is provided with a dead battery activating switch for connecting the booster battery to the dead battery of the vehicle through the above-mentioned resistor so as to temporarily provide the dead battery with a charge sufficient to subsequently operate the polarity detector when the voltage of the weak battery is too low for activating such polarity detector.

The invention will now be disclosed in details with reference to the accompanying drawings illustrating, by way of example, a preferred embodiment of the invention and in which:

FIG. 1 illustrates a schematic diagram of a booster; and

FIG. 2 illustrates a polarity detector which may be used in the system disclosed in FIG. 1.

In FIG. 1, there is illustrated a schematic diagram of a booster including a first relay A1 having a main set of contacts A1-1 and an auxiliary set of contacts A1-2, both of which are normally open, and a second relay A2 having normally closed sets of contacts A2-1 and A2-2 and a normally open set of contacts A2-3. Each set of contacts includes, in a known manner, two fixed contacts and a movable contact arranged to bridge the two fixed contacts. Two batteries B1 and B2 are permanently connected to predetermined fixed contacts of relay A2 and adapted for connection in parallel or in series depending upon the operation of the movable contacts of relay A2. The positive terminal of battery B1 is connected to the positive terminal of battery B2 through the normally closed set of contacts A2-1, and the negative terminals of batteries B1 and B2 are interconnected by the normally closed set of contacts A2-2. By opening the sets of contacts A2-1 and A2-2 and closing the set of contacts A2-3, the negative terminal of battery B1 may be connected in series with the positive terminal of battery B2, thus connecting the two batteries B1 and B2 in series. In addition, the positive terminal of battery B1 is permanently connected to the right-hand contact of fixed contacts A1-1 and A1-2, and the negative terminal of battery B2 is permanently connected to the right-hand contact of the fixed contacts of the set of contacts A2-2.

A resistor R is connected in series with the auxiliary set of contacts A1-2, and both the main set of contacts A1-1 and the series arrangement of contacts A1-2 and resistor R are connected in parallel. The left-hand fixed contact of the set of contacts A1-1 is connected to a cable 10 thereafter called the positive cable while the right-hand fixed contact of fixed contacts A2-2 is connected to a cable 12 thereafter called the negative cable. Positive cable 10 is connected to a clip 14 and negative cable 12 to a clip 16. Both clips 14 and 16 are used for connecting cables 10 and 12 respectively to the positive and negative terminals of the battery of the vehicle to be started.

Relay A1 comprises an electromagnetic winding and an armature supporting a piston 18 protruding through the movable contacts of the set of contacts A1-1 and A1-2, each movable contact being resiliently supported on piston 18 by means of a spring 20 resting at the lower end thereof on a ring 21 secured to piston 18. Piston 18 is biased downwardly by a spring (not shown) and in the deenergized condition of relay A-1, rests against a stop 22. It is also to be noted that the distance separating the fixed contacts and the movable contacts of the set of contacts A1-2 is smaller than the distance separating the fixed contacts and the movable contacts of the set of contacts A1-1 for a reason which will be disclosed in the operation of the system. The winding of relay A1 is energized from the positive terminal of battery B2 through a set of contacts A3-1 of a relay A3 having an electromagnetic winding and an armature for operating the set of contacts A3-1.

Relay A2 also comprises an electromagnetic winding and an armature supporting a piston 24 protruding through the movable contacts of the set of contacts A2-1, A2-2 and A2-3. In the example illustrated, piston 24 is biased downwardly by a spring (not shown) and, in the deenergized condition of relay A2, the movable contacts of the set of contacts A2-1 and A2-2 bridge their corresponding fixed contacts. In so doing, a spring 26, which is bearing at the upper end thereof against a ring 27 secured to piston 24, is slightly compressed by the movable contacts of the set of contacts A2-1 to establish a better contact. A spring 28 is loosely mounted on piston 24 between the movable contacts of the set of contacts A2-2 and A2-3 and is also slightly compressed when such movable contacts are actuated by rings 29 secured to piston 24. The winding of relay A2 is energized from the positive terminal of battery B2 through a set of contacts A4-1 of a relay A4 having an electromagnetic winding and an armature for operating the set of contacts A4-1.

Relay A3 is energized from the positive terminal of battery B2 through a circuit including a polarity detector PD, a pushbutton switch PB, a selection switch SS and a dead battery activating switch DBAS. Similarly, relay A4 is energized through pushbutton switch PB, selection switch SS and dead battery activating switch DBAS.

Polarity detector PD is responsive for operation to the positive potential of cable 10 appearing on sensing terminal A thereof. A detailed description of such circuit will be found in the description of FIG. 2 of the drawings. However, let us mention for the moment that conduction is established between terminals B and C of the polarity detector when a suitable potential is applied to sensing terminal A.

The system in accordance with the invention is provided with a hand control device including the above-mentioned pushbutton switch PB and selection switch SS. The pushbutton switch PB is biased into a retracted position by a spring 30 located between the enclosure 32 of the switch and the head 34 of the pushbutton. The selection switch SS is activated to the upper or lower position thereof depending upon the output voltage required for boosting the battery of the vehicle. Such voltage is, in the example shown, 24 volts when the two batteries B1 and B2 are to be connected in series, and 12 volts when the two batteries B1 and B2 are to be connected in parallel.

The depression of pushbutton switch PB closes contacts PB-1 in the energizing circuit of relay A3 and energizes relay A3 when the selection switch SS is either in the upper or lower position through normally closed contacts DBAS-1 of the above-mentioned dead battery activating switch DBAS.

The depression of pushbutton switch PB also closes contact PB-2 in the energizing circuit of relay A4 and causes energization of relay A4 when the selector switch SS is in the upper position only through the normally closed contacts DBAS-1 of dead battery activating switch DBAS. It is to be noted that the structure of pushbutton switch PB is such that contacts PB-2 are always closed ahead of contacts PB-1. Such construction causes the operation of relay A4 and the subsequent operation of relay A2 ahead of the operation of relays A3 and A1, thus preventing any arcing across the contacts of relay A2.

The dead battery activating switch DBAS, located in the energizing circuits of relays A3 and A4, has normally closed contacts DBAS-1, as mentioned previously, and normally open contacts DBAS-2. The depression of the dead battery activating switch DBAS opens contacts DBAS-1 to prevent energization of relays A3 and A4 (and A1 and A2), and closes contacts DBAS-2 to activate relay A5 from the positive terminal of battery B2. The energization of relay A5 closes contacts A5-1 thereby connecting the positive terminal of battery B1 to the positive cable 10 through resistor R to provide the dead battery of the vehicle with a temporary charge which is sufficient to subsequently operate the polarity detector PD when the dead battery activating switch is subsequently released after a period of 5 seconds, for example. The amount of current flowing through such circuit will depend on the counter voltage of the battery of the vehicle to be started. A circuit breaker F is located in the above circuit for limiting the current therethrough to a predetermined amount of, for example, 50 amperes in the event that the dead battery is short circuited or wrongly connected.

In the electrical diagram of FIG. 1, the the heavy current circuits for boosting the dead battery of a vehicle have been shown in heavier lines than the control circuits.

In FIG. 2, there is shown a suitable polarity detector comprising a silicon-controlled rectifier SCR having its main electrodes connected to terminals B and C and a control electrode connected to terminal A through a resistor R1. Terminals A, B and C are the terminals of the polarity detector illustrated in a block diagram form in FIG. 1 of the drawings. A resistor R2 is connected between the control electrode of the silicon-controlled rectifier and the main electrode thereof connected to terminal B for producing the required voltage drop across said electrodes to fire the silicon-controlled rectifier. A zener diode Z is connected in parallel with resistor R2 for bypassing the current through resistor R2 if such current creates a drop of voltage across resistor R2 which could damage the silicon-controlled rectifier. As it is commonly known, zener diode Z becomes conductive when a voltage higher than its breakdown voltage is applied thereto. Finally, a capacitor C1 is connected across the main electrodes of the silicon-controlled rectifier in a known manner.

In operation, when the voltage applied to terminal A is of the proper polarity and when the voltage drop across terminals A and B becomes higher than a predetermined value, the silicon-controlled rectifier becomes conductive and current flows through it from terminals B to C. On the other hand, if the voltage applied to terminal A is not of the proper polarity or not sufficient to bias the silicon-controlled rectifier into conduction, no current flows from terminal B to terminal C.

The operation of the above-described system is as follows:

If it is desired to boost the weak battery of a vehicle, slips 14 and 16 are connected to the proper terminals of the weak battery and the polarity detector becomes conductive provided that the voltage of the weak battery is high enough. If a 12-volt supply is needed, selection switch SS is moved to its lower position and pushbutton PB is depressed to close contacts PB-1 and PB-2. The closure of contacts PB-2 will not have any effect on the system since such contacts are related to the 24-volt supply. The closure of contacts PB-1 causes the operation of relay A3 which closes contacts A3-1 and causes the energization of the winding of relay A1. The energization of the winding of relay A1 will cause the operation of the armature thereof and the movement of piston 18 in the upward direction. During such movement, the movable contacts of the set of contacts A1-2 will bridge the fixed contacts thereof before the movable contacts of the set of contacts A1-1 bridges its corresponding fixed contacts because of the difference in the respective spacing between the fixed contacts and the movable contacts of each set of contacts. Such will cause relay R to be first connected in the circuit and so prevent any arcing across the main set of contacts A1-1. Since relay A2 is not energized, the set of contacts A2-2 and A2-2 are closed and batteries B1 and B2 are connected in parallel across clips 14 and 16.

If it is desired to apply a 24-volt supply to the weak battery of the vehicle, selection switch SS is moved to its upward position and clips 14 and 16 are connected as in the previous description. Pushbutton switch PB is depressed to operate relays A3 and A1 as mentioned previously. In addition, the closure of contacts PB-2 will now operate relay A4 and cause the closure of contacts A4-1 to produce the energization of the winding of relay A2. Relay A2 will consequently move its armature and piston 24 upward thereby breaking the sets of contacts A2-1 and A2-2 and closing the set of contacts A2-3. Batteries B1 and B2 are then connected in series across clips 14 and 16.

If the battery of the vehicle to be started is dead or does not produce a voltage sufficient to drive the polarity detector PD into conduction, the dead battery activating switch DBAS may be operated to energize relay A5 and close contact A5-1 to provide the weak battery with a temporary charge which may be sufficient to energize the polarity detector PD when the dead battery activating switch is released. It may be easily seen that, because of contacts DBAS-1 relays A3 and A4 may not be activated unless the dead battery activating switch DBAS is released. As mentioned previously, fuse F prevents any excess current from flowing through the system if the battery of the vehicle is short circuited or wrongly connected.

I claim:

1. A system for use in boosting the weak battery of a vehicle to permit operation of the starter of said vehicle comprising:
  a. at least one booster battery for providing the required energy for boosting the weak battery;
  b. a first relay having an electromagnetic winding connected to an energizing circuit, and an armature operated by said electromagnetic winding and supporting a first set of contacts and an auxiliary set of contacts;
  c. a resistor connected in series with said auxiliary set of contacts;
  d. means including the series connection of said auxiliary set of contacts and said resistor in parallel with said main set of contacts for connecting said booster battery to said weak battery;

e. a polarity detector positioned in the energizing circuit of said first relay so as to prevent energization of said first relay when the terminals of the booster battery are connected to the opposite terminals of the weak battery; and f. a dead battery activating switch interconnecting said booster battery and said weak battery through said resistor so as to temporarily provide the weak battery of the vehicle with a charge sufficient to subsequently operate said polarity detector if the voltage of the battery of the vehicle is too low for activating said polarity detector.

2. A system as defined in claim 1, wherein said means for connecting said booster battery to said weak battery includes a pair of cables.

3. A system as defined in claim 2, wherein said polarity detector comprises a silicon-controlled rectifier having main electrodes connected in the energizing circuit of said first relay and a sensing electrode adapted for connection to one of said cables.

4. A system as defined in claim 1, further comprising a second relay having a corresponding electromagnetic winding and an armature responsive to energization of the electromagnetic winding for operating a pair of contacts in series with the electromagnetic winding of said first relay, the electromagnetic winding of said second relay being connected in series with said polarity detector.

5. A system as defined in claim 4, further comprising a manual switch having a first pair of contacts located in series with the electromagnetic winding of said second relay for operating said second relay.

6. A system as defined in claim 5, wherein there are provided at least two booster batteries normally connected in parallel and further comprising a third relay having a corresponding electromagnetic winding connected to a third energizing circuit and an armature for operating a normally closed set of contacts for connecting said batteries in parallel and a normally open set of contacts for connecting said batteries in series upon energization of said third energizing circuit.

7. A system as defined in claim 6, further comprising a fourth relay having a corresponding electromagnetic winding and an armature responsive to said electromagnetic winding to operate a set of contacts located in the energizing circuit of said third relay for operating said third relay.

8. A system as defined in claim 7, further comprising a selection switch located in series with the electromagnetic winding of said fourth relay for energizing said fourth relay when said two batteries are to be connected in series.

9. A system as defined in claim 8, further comprising a second pair of contacts of said pushbutton switch in series with the electromagnetic winding of said fourth relay, and wherein said second pair of contacts is closed first for operating said fourth relay ahead of said second relay and so prevent any arcing on the contacts of said third relay.